Patented Apr. 15, 1947

2,419,030

UNITED STATES PATENT OFFICE 2,419,030

PRODUCTION OF 2,3-DIMETHYL-BUTADIENE-1,3

Julian A. Otto, Long Island City, N. Y., and Albert E. Anderson, Danielson, Conn., assignors to General Chemical Company, New York, N. Y., a corporation of New York No Drawing. Application May 7, 1945, Serial No. 592,528

4 Claims. (Cl. 260—681)

This invention relates to the production of 2,3-dimethylbutadiene-1,3 by dehydration of pinacol.

2,3-dimethylbutadiene-1,3 is a diolefin which is potentially of considerable industrial importance as a starting material for production of synthetic plastics, particularly synthetic rubber, by polymerization and copolymerization. Various methods have been proposed heretofore for forming this dimethylbutadiene by dehydration of pinacol; for example, it has been proposed to heat pinacol in the liquid phase in the presence of hydrobromic acid, whereupon a portion of the pinacol slowly is dehydrated to form dimethylbutadiene which is removed as distillate. It has also been proposed to dehydrate pinacol to dimethylbutadiene in the vapor phase by passing pinacol vapor in contact with aluminum oxide at temperatures approaching 500° C.; this particular dehydration, as described in the prior art, has been carried out on only a laboratory scale and pyrex tubes have generally been employed as the catalyst chamber. In the prior art descriptions of other vapor phase dehydrations of alcohols to olefins, only iron, steel, or stainless steel have been suggested as a substitute for commercially impractical glass or quartz. Such suggestions are found, for example, in United States Patents 2,237,866 of April 8, 1941, 2,224,912 of December 17, 1940, and 2,345,113 of March 28, 1944.

Attempts to place the vapor phase process for producing 2,3-dimethylbutadiene-1,3 by catalytic dehydration of pinacol into commercial operation have been discouraging because when it has been attempted to use more practical materials than glass as the material of construction for the catalyst chamber, e. g. materials such as the steel or stainless steel suggested in the above patents relating to dehydrations of other alcohols, it has been found that yields of 2,3-dimethylbutadiene-1,3 have become unaccountably erratic. It can only be concluded that this is due to an adverse catalytic effect of the surface of the steel or stainless steel chamber. Glass vessels are undesirable for use on a large scale because of low heat conductivity and fragility; other materials, such as brass or copper, that might be considered as construction materials corrode unduly either during the reaction or during subsequent blowing of the catalyst chamber with air for catalyst reactivation.

An object of this invention is to provide a satisfactory large scale process whereby 2,3-dimethylbutadiene-1,3 may be produced from pinacol in excellent yields.

We have now discovered that although materials such as steel or stainless steel, which one would expect to be inert to the reactants and reaction products present in the vapor phase dehydration of pinacol to 2,3-dimethylbutadiene-1,3 over an aluminum oxide catalyst, interfere with the dehydration or catalyze side reactions to such an extent as to make the process unattractive commercially, there is one class of construction materials, namely non-ferrous metals comprising predominantly nickel, e. g. nickel, Monel metal or nichrome, that surprisingly does not interfere with the vapor phase dehydration process. We have found that high yields of 2,3-dimethylbutadiene-1,3 may be maintained over a long period of time by carrying out the vapor phase dehydration of pinacol over an aluminum oxide catalyst contained in a chamber made or lined with a non-ferrous metal comprising predominantly nickel, so that the reactants, while at reaction temperature, are in contact with the non-ferrous metal surface, but not in contact with a substantial amount of a ferrous metal.

In carrying out the process of our invention, an aluminum oxide which has been found suitable for use as catalyst is the activated alumina, grade F-1, of the Aluminum Ore Company; this grade of alumina has an $Al_2O_3$ content of about 92.0%. The alumina is preferably employed in lumps ranging from 4 to 8 mesh. In accordance with the process of our invention the lumps of alumina are packed into a catalyst chamber which may be constructed entirely of a non-ferrous metal comprising predominantly nickel or may be made of ordinary steel lined with such non-ferrous metal at all points where vapors of pinacol at high temperatures will contact the catalyst chamber; Monel metal, i. e. the alloy containing about 67% nickel, about 30% copper and small amounts of iron, silicon, carbon and manganese, is preferably employed, but nickel or nichromes, i. e. those alloys the principal constituents of which are nickel, chromium and iron in proportions of about 54% to 80% nickel, 10% to 20% chromium and 7% to 27% iron, may also be employed.

Anhydrous pinacol (which may be prepared from pinacol hydrate by preliminary distillation) is continuously vaporized to obtain a stream of pinacol vapor. The vaporization may be carried out in a vaporizer made of Monel metal. At ordinary pressure the pinacol will vaporize at about 170° C., while at pressures somewhat below atmospheric, e. g. 20 to 120 mm. mercury absolute (the preferred pressures for carrying out the dehydration), the pinacol is vaporized at a substantially lower temperature, e. g. 85° to 130° C.

The pinacol vapor is passed into the above-described catalyst chamber packed with aluminum oxide and maintained at a temperature in the neighborhood of about 400° to 500° C., preferably 420° to 480° C., wherein it is largely dehydrated to form 2,3-dimethylbutadiene-1,3 and water. The gaseous reaction product is passed through a partial condenser, preferably maintained at a temperature in the range of about 0° to −20° C., to remove water, unreacted pinacol, and possibly small amounts of liquid by-products such as pinacoline and isopropyl alcohol. The gas which passes out of this partial condenser contains the desired 2,3-dimethylbutadiene-1,3 product. This product is liquified by passing it through a condenser maintained at −60° to −80° C.

After operation for a period of time, usually ranging from 5 to 7 hours, it is desirable to reactivate the aluminum oxide catalyst. This is accomplished by passing air through the catalyst chamber at a temperature generally above 420° C. and ranging up to as high as 650° C. When air has thus been passed through the catalyst chamber for about 6 hours, the catalyst is ready for reuse for dehydration of further pinacol.

In the following example, illustrative of the process of our invention, the marked difference in yield of the dimethylbutadiene which is obtained employing steel, on the one hand, and Monel metal, on the other hand, as the material of construction for the catalyst chamber, is clearly demonstrated.

*Example.*—Catalyst chambers were prepared from steel and from Monel metal for two parallel runs on vapor phase dehydration of pinacol. In each case, the catalyst chamber was in tubular form. The steel employed was of the type known commercially as medium steel, containing 0.25%-0.60% carbon. The Monel metal contained 67% nickel, 30% copper and traces of iron, silicon, manganese and carbon. Each of these catalyst chambers was packed with 4-8 mesh aluminum oxide of the type known commercially as Activated Alumina, Grade F-1, made by Aluminum Ore Company.

Pinacol vapor prepared by vaporization of anhydrous pinacol was passed through each of these catalyst chambers under an absolute pressure of 120 mm. of mercury and the catalyst chamber in each case was maintained at substantially the same temperature, ranging from 420° to 480° C. 2,3-dimethylbutadiene-1,3 was recovered from the product of the dehydration reaction as above described.

Dehydration was thus continued for a number of hours and the overall conversion of pinacol to dimethylbutadiene resulting from each run is shown in the following tabulation:

| Catalyst Chamber Material | Dimethylbutadiene Yield |
|---|---|
| | Per cent |
| Monel Metal | 89.6 |
| Steel | 44.5 |

The aluminum oxide catalyst, in each case, was thereafter reactivated by passing air through the catalyst chamber at temperatures ranging from 420° to 650° C. The air had no serious adverse effect on the material of either catalyst chamber at these high temperatures.

Since certain changes may be made in carrying out the above process without departing from the scope of the invention, it is intended that all matter contained in the above description shall be interpreted as illustrative and not in a limiting sense.

We claim:

1. In the catalytic vapor phase dehydration of pinacol to 2,3-dimethylbutadiene-1,3 at elevated temperatures, the improvement which comprises maintaining reaction chamber surfaces made of a non-ferrous metal comprising predominantly nickel in contact with the reactants at said elevated temperatures.

2. In the catalytic vapor phase dehydration of pinacol to 2,3-dimethylbutadiene-1,3 at temperatures in the neighborhood of 400° to 500° C., the improvement which comprises maintaining the reactants at said elevated temperatures in contact with reaction chamber surfaces made of a non-ferrous metal comprising predominantly nickel.

3. In the catalytic vapor phase dehydration of pinacol to 2,3-dimethylbutadiene-1,3, the improvement which comprises passing pinacol vapor over an aluminum oxide catalyst contained within a chamber having its inner surface made of Monel metal, at a temperature in the neighborhood of 400° to 500° C.

4. In the catalytic vapor phase dehydration of pinacol to 2,3-dimethylbutadiene-1,3, the steps that comprise passing pinacol vapor over an aluminum oxide catalyst contained within a chamber having its inner surface made of Monel metal, at a temperature in the neighborhood of 400° to 500° C., and after the activity of the catalyst has decreased reactivating said catalyst by passage of air in contact therewith at a temperature in the neighborhood of 420° to 650° C.

JULIAN A. OTTO.
ALBERT E. ANDERSON.

REFERENCES CITED

The following references are of record in the file of this patent:

UNITED STATES PATENTS

| Number | Name | Date |
|---|---|---|
| 2,215,950 | Young | Sept. 24, 1940 |
| 2,272,711 | Hull | Feb. 10, 1942 |

FOREIGN PATENTS

| Number | Country | Date |
|---|---|---|
| 137,389 | Swiss | Mar. 17, 1930 |
| 9,471 | British | June 19, 1943 |

OTHER REFERENCES

Talalay et al., Rubber Chemistry and Technology, vol. 15, 403–429 (1942); pages 409–13, 423, 424 and 429, especially pertinent. (Copy in Div. 38.)